United States Patent [19]

Swearingen

[11] Patent Number: 4,495,035
[45] Date of Patent: Jan. 22, 1985

[54] FLUID HANDLING METHOD WITH IMPROVED PURIFICATION

[76] Inventor: Judson S. Swearingen, 24703 Pacific Coast Hwy., Malibu, Calif. 90265

[21] Appl. No.: 241,120

[22] Filed: Mar. 6, 1981

[51] Int. Cl.³ .................... B01D 3/34; C10M 11/00; F01M 11/03
[52] U.S. Cl. .......................... 203/23; 203/2; 203/50; 203/70; 203/DIG. 16; 203/DIG. 19; 208/184; 208/348; 208/351; 208/353; 415/1; 415/112; 415/168; 415/175; 585/867
[58] Field of Search ................. 415/175, 176, 1, 168, 415/110-112, ; 202/206; 203/23, 2, 70, 50, DIG. 16, DIG. 19, 99; 208/184, 290, 298, 348, 351, 353; 585/800, 867

[56] References Cited

U.S. PATENT DOCUMENTS

| | | | |
|---|---|---|---|
| 2,433,286 | 12/1947 | McKinnis | 203/70 |
| 3,257,957 | 6/1966 | Tracy | 415/112 |
| 3,420,434 | 1/1969 | Swearingen | 415/176 |
| 3,423,291 | 1/1969 | Oglesby | 203/23 |
| 3,532,444 | 10/1970 | Strub | 415/112 |
| 3,651,866 | 3/1972 | Lileg et al. | 415/112 |
| 3,864,242 | 2/1975 | Watanabe | 208/184 |
| 4,129,606 | 12/1978 | Geuartowski | 203/23 |
| 4,193,603 | 3/1980 | Sood | 415/112 |
| 4,356,006 | 10/1982 | Miller et al. | 415/175 |
| 4,360,420 | 11/1982 | Fletcher et al. | 208/184 |

FOREIGN PATENT DOCUMENTS 707595  4/1954  United Kingdom ................ 208/184

Primary Examiner—Wilbur Bascomb
Attorney, Agent, or Firm—Lyon & Lyon

[57] ABSTRACT

The invention pertains to improvements in a fluid handling system in which a working fluid passes through a rotor while undergoing a pressure change. A shaft extends longitudinally from and rotates with the rotor. A first seal surrounds the shaft in axially spaced relation to the rotor, and a lubricant having a minimum boiling point is injected into the first seal adjacent the shaft at a pressure sufficient to cause the lubricant to flow axially toward the rotor. A housing surrounds the rotor and shaft and defines a contact zone between the rotor and the first seal for receiving both lubricant and a contact fluid such as the working fluid or a seal buffer gas used to isolate the working fluid from the lubricant. The contact fluid has a maximum boiling point substantially less than the minimum boiling point of the lubricant. A composite liquid comprising contact fluid and lubricant is collected from the contact zone and the contact fluid separated therefrom by fractional distillation in the presence of an additive fluid having a boiling point greater than the maximum boiling point of the contact fluid but less than the minimum boiling point of the lubricant.

15 Claims, 1 Drawing Figure

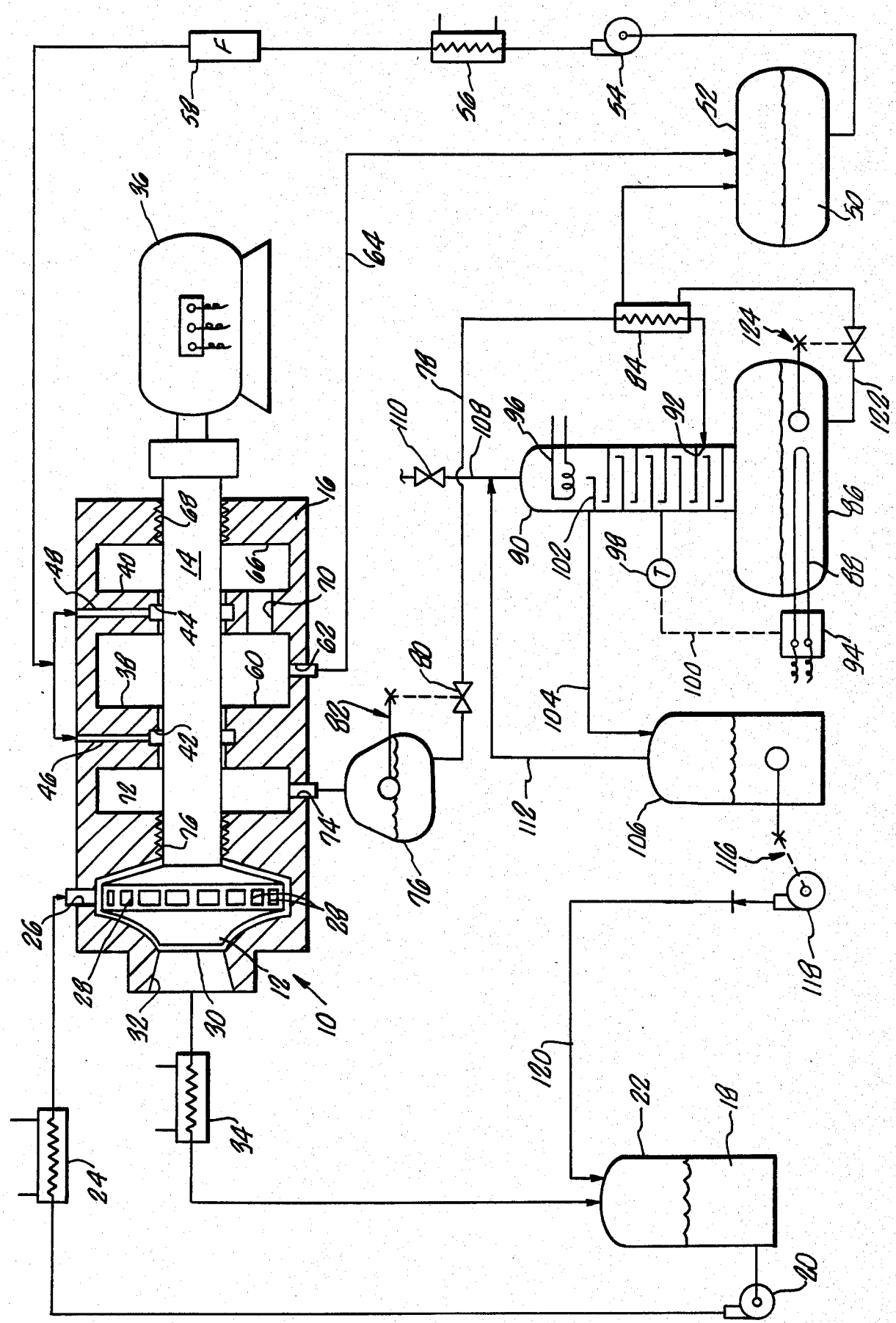

FLUID HANDLING METHOD WITH IMPROVED PURIFICATION

BACKGROUND OF THE INVENTION

1. Field of the Invention

The invention pertains to sealing arrangements for rotary fluid handling devices, and more specifically, to devices such as turboexpanders and compressors in which a working fluid passes through a rotor while undergoing a pressure change. The rotor typically has a shaft extending longitudinally therefrom and rotating therewith, and both the rotor and shaft are surrounded by a housing which either forms or mounts a set of bearings for supporting the shaft. These bearings are lubricated, usually by a suitable oil.

In general, it is necessary, or at least desirable, to prevent working fluid from entering the bearing area of the apparatus, and conversely, to prevent lubricant from entering the rotor area. One reason for this is that either of these two fluids can interfere with proper functioning of the other. Another reason is that the working fluid is frequently highly explosive, and if it should enter the bearing area, it could eventually leak to atmosphere creating a hazardous situation.

Accordingly, in most such devices, there is a seal between the rotor and the bearing area of the housing, and the lubricant is injected thereinto at a pressure sufficient to cause it to flow axially toward the rotor. This seal may be one of the bearings itself, although it need not be. In many such devices, a second seal, such as a labyrinth seal, is provided about the shaft closely adjacent the rotor to retard the flow of working fluid axially from the rotor area and/or to prevent lubricant from entering the latter area. However, since some leakage of working fluid through the second seal occurs or since a similar or identical working fluid may be injected as a buffer gas, the lubricant and working fluid will come into working contact with each other in a zone between the first and second seals, referred to hereinafter as the "contact zone".

In some systems, a seal gas or buffer gas, which is compatible with, and preferably a component of, the working fluid, is injected into the second seal at a pressure sufficient to cause it to flow in both axial directions, thereby isolating the working fluid from the lubricant. In such systems, some of the seal gas flows into the area of the housing surrounding the rotor and is entrained in the working fluid. Other seal gas flows into the aforementioned zone between the first and second seals and comes into contact with the lubricant.

Thus, in any event, a contact fluid, which, as described, may be working fluid, seal gas, or both, is exposed to the lubricant in the aforementioned contact zone.

2. Description of the Prior Art

For various reasons, it is desirable to collect the contact fluid and lubricant from the contact zone of the apparatus, separate the contact fluid from the lubricant, and recycle either or both of these fluids through the apparatus. Since the contact fluid is much lighter or more volatile than the lubricant, in some instances, at least a major portion of the separation can be achieved by simply directing the contact fluid and lubricant into a vessel maintained at a pressure at which the contact fluid is a gas and the lubricant is a liquid whereby they will separate naturally. Various prior art systems have been devised for this purpose.

However, where the contact fluid is soluble in the lubricant, separation of the two is more difficult, and thus some prior art systems have included means for heating the solution to effect the necessary separation. In these systems, in general, it has been necessary to heat the solution to the boiling point of the lubricant in order to achieve adequate separation. However, such heating is undesirable, since many of the preferred lubricants have boiling points so high that they cannot be heated to the point of vaporization without deterioration of the lubricating properties of the lubricant.

Summary of the Invention

The present invention permits the use of highly preferred high boiling lubricants while still providing for virtually total separation of solutions of the contact fluid in the lubricant by the use of a third fluid, called an "additive fluid", which may be mixed with the lubricant and circulated through the bearings therewith. The additive fluid will ordinarily be a $C_5$-$C_8$ hydrocarbon such as hexane, heptane or octane, which is heavier than the contact fluid and hence has a boiling point greater than the maximum boiling point of the contact fluid, but still relatively volatile with a boiling point less than the minimum boiling point of the lubricant. Since the contact fluid may be working fluid or a mixture, as previously explained, the boiling point of the additive fluid must be greater than the maximum boiling point of the contact fluid. Similarly, the lubricant may be a hydrocarbon mixture, and consequently, the boiling point of the additive fluid must be less than the minimum boiling point of the lubricant. Fluorinated hydrocarbons such as trichlorofluoromethane, which is available commercially under the trademark Freon 11, which are non-combustible, may also be used as the additive fluid. Fluorinated hydrocarbons have the advantage of having the lubricant virtually completely stripped of combustible working fluid in solution, thus raising its flash point.

A composite liquid comprising a mixture or solution of the lubricant and the contact fluid will thus be formed in the contact zone of one of the rotary apparatus, collected from the contact zone, and the contact fluid separated from the composite liquid by fractional distillation. If, as in the preferred embodiments, the additive fluid is mixed with the lubricant throughout the system, the composite liquid will also contain additive fluid. In any event, the additive fluid will be added at such point that it will be present in the composite liquid in the distillation zone.

In the distillation zone, the composite liquid is heated to a temperature greater than or equal to the boiling point of the additive fluid lubricant mixture but less than the minimum boiling point of the lubricant. In this way, at least some of the additive fluid is caused to vaporize and separate from the lubricant without boiling and consequent deterioration of the latter. Nevertheless, the phase change of the additive fluid in conjunction with the heating will cause virtually all of the contact fluid to be vaporized and swept out of and separated from the lubricant.

Due to the temperature gradient in the fractional distillation zone, the various components of the vaporized portion of the composite liquid condense at different points along the distillation zone. Since the contact fluid has a lower maximum boiling point than the additive fluid, it condenses in the upper portion of the distillation zone, above the point of condensation of the additive fluid. Thus, the contact fluid can be recovered from the distillation zone adjacent its respective distillation point without any additive fluid, lubricant, or other heavier fluid being contained therein. This is particularly advantageous where the contact fluid comprises the working fluid for the rotor. Components lighter than the working fluid can be discharged as an overhead fraction to ensure that the working fluid collected is pure. Such purified working fluid can then be recycled through the rotary apparatus.

Likewise, liquefied lubricant and additive fluid, which form a bottom fraction, can be removed from the lower portion of the distillation zone and recycled through the bearings of the rotary apparatus. Since this lubricant and additive fluid mixture will be hot as it leaves the chamber, it can be used to preheat the incoming composite liquid by passing the two in non-communicative heat exchange relation with each other. The preheated composite liquid can then be introduced at an intermediate point in the distillation zone.

In most instances, the mixing of the additive fluid with the lubricant will reduce the viscosity of the latter. Accordingly, the lubricant per se should be chosen to have a sufficiently greater viscosity than desired for lubrication of the bearings to compensate for the reduction effected by the addition of the additive fluid.

It is a principal object of the present invention, therefore, to provide an improved system and method for separating the lubricant of a rotary fluid handling apparatus from a contact fluid such as working fluid and/or seal gas.

Another object of the present invention is to provide such an improved system and method through the use of an additive fluid.

It is another object of the invention to provide such an improved system and method by use of an additive fluid which enables the lubricant to be stripped of combustible working fluid and its flash point raised.

Still another object of the present invention is to provide such a system and method which utilizes a significant amount of the waste heat resulting from the purification process.

Still other objects, features and advantages of the present invention will be made apparent by the following detailed description of the preferred embodiments, the drawing, and the claims.

BRIEF DESCRIPTION OF THE DRAWING

The FIGURE is a flow diagram showing a system in accord with the present invention.

DESCRIPTION OF THE PREFERRED EMBODIMENT

Referring now to the drawing, the numeral 10 generally designates a turboexpander comprising a rotor 12, a shaft 14 extending longitudinally from and rotating with rotor 12, and a housing 16 surrounding both rotor 12 and shaft 14. A working fluid 18, which may be, for example, isobutane, propane, or a similar $C_4$ or other hydrocarbon having a relatively low boiling point, is removed by pump 20 from a reservoir 22 and passed through a heat exchanger 24 where it is vaporized and preferably superheated. The working fluid then enters an inlet 26 in housing 16 and thence into a series of inlets 28 opening radially into the large end of rotor 12. Inlets 28 lead into respective passageways through rotor 12 which curve radially inwardly and axially to the left, as viewed in the FIGURE, to outlets opening axially through the small end 30 of rotor 12. The working fluid then leaves housing 16 through outlet 32 and is condensed by passing through heat exchanger 34. The condensed working fluid then passes back into reservoir 22 for recycling by pump 20. As the working fluid passes through rotor 12, it undergoes a pressure change, more specifically an expansion, which, due to the configuration of the rotor passages, causes the rotor to rotate and drive shaft 14. Shaft 14 in turn extends axially from housing 16 to drive an electric generator 36 or the like connected thereto. Housing 16 either forms or mounts a pair of annular radial bearings 38 and 40 which closely surround shaft 14 to support it for rotation. Bearings 38 and 40 have respective annular grooves 42 and 44 therein, and these grooves communicate with respective passageways 46 and 48 extending outwardly through housing 16. A lubricant fluid 50, e.g., a suitable hydrocarbon oil, is drawn from a reservoir 52 by a pump 54 and passed through a heat exchanger 56, which cools the oil, a filter 58, and into passageways 46 and 48. From these passageways, the oil enters grooves 42 and 44. The pressure imparted to the oil by pump 54 is sufficient to cause it to flow from grooves 42 and 44 in both axial directions along the radially inner faces of bearings 38 and 40 thereby lubricating these bearings. In the simplified diagram herein, only radial bearings are shown. However, it should be understood that in an actual expander thrust bearings would ordinarily be formed adjacent the radial bearings and the oil would also flow through and lubricate these bearings.

Oil emerging from the left hand end of bearing 40 and the right hand end of bearing 38 enters a central compartment 60 formed in housing 16 between the two bearings. This oil is drained from compartment 60 through an outlet 62 in housing 16 and returned to reservoir 52 by conduit 64. Oil emerging from the right hand end of bearing 40 enters a compartment 66 in housing 16 between bearing 40 and a seal 68 which seals housing 16 with respect to shaft 14 adjacent the end of the shaft which extends from the housing to generator 36. A bore 70 through bearing 40 allows oil to pass from compartment 66 to compartment 60 and then into outlet 62. Finally, oil emerging from the left hand end of bearing 38 enters a compartment 72 in housing 16 and is drained from compartment 72 through outlet 74.

Apparatus 10 has been described as a turboexpander. However, the improvement to be described hereinafter can be applied equally well to other types of fluid handling apparatus such as compressors. A compressor would have a rotor somewhat similar to rotor 12. However, in a compressor, the working fluid would enter axially through the small end of the rotor and exit radially through the large end, undergoing a pressure increase, rather than an expansion, as it passes through the rotor. The shaft would be used to drive the rotor, rather than being driven thereby.

In any event, the working fluid is pressurized to some extent at all points throughout the rotor, and some of this pressurized working fluid enters the space between the exterior of the rotor and the immediately adjacent portion of housing 16. In order to maintain the necessary pressure in the rotor area of the housing and to inhibit leakage of working fluid along shaft 14, a labyrinth seal 76 is formed on housing 16 closely surrounding shaft 14 adjacent rotor 12. Although seal 76 achieves the aforementioned purposes, it is not an absolute seal, but rather does permit a certain amount of working fluid to pass into compartment 72. However, as previously mentioned, the lubricant is injected through passageway 46 into the bearing 38 closest to rotor 12 at a pressure sufficient to cause said lubricant to flow axially toward the rotor and enter compartment 72. Thus bearing 38 serves not only as a bearing per se but also as a positive lubricated seal preventing working fluid from passing from compartment 72 into the bearing area of housing 16. Were no working fluid ever removed from compartment 72, static conditions would prevail as between that compartment and the area of housing 16 immediately surrounding rotor 12. However, since the working fluid is soluble in the lubricant, at least some working fluid is continuously removed from compartment 72 through outlet 74 along with the lubricant. Due to the pressure existing about rotor 12, the working fluid removed from compartment 72 will be replaced by additional working fluid leaking through seal 76. Accordingly, there is a flow of working fluid through seal 76 which positively prevents lubricant from entering the rotor area of housing 16.

In order to facilitate separation of the working fluid and lubricant drained from compartment 72, an additive fluid is mixed with the lubricant in reservoir 52 and injected by pump 54 into bearing passageways 46 and 48 so that some of this additive fluid enters compartment 72 along with the lubricant. Thus, the liquid drained from compartment 72 through outlet 74 will comprise a solution of the lubricant and additive fluid with working fluid also dissolved therein. This liquid will be referred to herein as a "composite liquid." In other embodiments, the additive fluid may not be mixed with the lubricant and circulated therewith thoroughout the entire system, but rather, may be added at some point downstream of housing 16 but upstream of or within the distillation zone to be described below. Likewise, in still other embodiments, a seal or buffer gas, compatible with and preferably a component of the working fluid, may be injected into seal 76 at a pressure sufficient to cause it to flow in both axial directtions along shaft 14. Ideally, such use of a seal gas will prevent intermingling of the working fluid and lubricant, so that only seal gas and lubricant enter compartment 72. In any event, the composite liquid drained from compartment 72 will at least include lubricant and some type of contact fluid, such as working fluid and/or seal gas.

The working fluid has a maximum boiling point. If the working fluid is a pure substance or an azeotropic mixture, the "maximum boiling point," as that term is used herein, is simply the boiling point of the working fluid. If the working fluid is a mixture which vaporizes over a range of temperatures or whose components vaporize at different temperatures, the "maximum boiling point" will be the upper limit of the range or the greatest of the various components' boiling points. In any event, the maximum boiling point of the working fluid is ordinarily relatively low, the working fluid normally being a gas at ambient conditions. The lubricant, on the other hand, has a minimum boiling point which is substantially greater than the maximum boiling point of the working fluid. The additive fluid, which is soluble in the lubricant, is chosen so that it has a boiling point which is greater than the maximum boiling point of the working fluid but less than the minimum boiling point of the lubricant. For example, where the working fluid is a relatively light hydrocarbon such as isobutane, propane, or a mixture of such light hydrocarbons, and the lubricant is a typical lubricating oil, a $C_5$-$C_8$ hydrocarbon such as hexane, heptane or octane, which is heavier than the working fluid but still relatively volatile, may be used as the additive fluid.

Because the addition of the additive fluid to the lubricant will ordinarily reduce its viscosity, the lubricant should be chosen so as to compensate for this effect. For example, hexane dissolved in a typical lubricant oil to the extent of 5% will reduce the viscosity by about 50% over the original viscosity of the lube oil. Therefore, the oil selected should be about twice as viscous as necessary for proper lubrication of the bearings. Given such a solution of hexane in lube oil, the hexane can be vaporized at about 250 degrees Farenheit without vaporization of or damage to the oil, whose minimum boiling point would be in the range of about 600 degrees Farenheit and greater.

As mentioned above, a composite liquid comprising working fluid and additive fluid dissolved in lubricant is drained from compartment 72 of housing 16 through an outlet 74. This composite liquid then passes into a collection sub-system including a tank 76 having an outlet conduit 78 communicating with the separation subsystem to be described below. Egress of liquid from tank 76 through conduit 78 is controlled by valve 80, which in turn is regulated by a float control mechanism 82. Conduit 78 also contains a heat exchanger 84 for preheating the composite liquid before it enters the separation system.

The separation sub-system includes a reboiler or chamber 86 in which is disposed a heating coil 88. A distillation column 90 is communicatively connected to reboiler 86 and extends upwardly therefrom so that column 90 and reboiler 86 together define a fractional distillation zone. Column 90 has an inlet 92 spaced slightly above the upper end of reboiler 86 through which composite liquid passes into column 90. Some of the lighter components of the composite liquid flash upon introduction into column 90. However, the major portion of this liquid will flow downwardly through the lower portion of column 90 and enters reboiler 86 to be heated by coil 88. The temperature of coil 88 is regulated by a control mechanism 94 so that the composite liquid in reboiler 86 is heated to a temperature greater than or equal to the boiling point of the additive fluid lubricant mixture but substantially less than the minimum boiling point of the lubricant. For example, where the working fluid is isobutane, the additive fluid is hexane, and the lubricant is lube oil, the composite liquid might be heated to about 250 degrees Farenheit. This will cause vaporization of at least some of the hexane. The heating, in conjunction with the separation of the hexane from the lubricant by vaporization, will cause the hexane vapor to flow upwardly into column 90, and therein it will also cause virtually all of the isobutane to separate in vaporized form from the downflowing lubricant. Accordingly, a vaporized portion of the composite liquid, including hexane, isobutane, and any impurities lighter than isobutane which may be present in the composite liquid, will flow upwardly in column 90.

Column 90, which is operated under reflux, will naturally have a temperature gradient therealong, with the highest temperature adjacent reboiler 86 and the lowest temperature adjacent the upper end of the column, at or near cooling coil 96. The temperature at a point between the extremities of column 90 is monitored by a sensor 98. The sensor is operatively associated with regulator 94 of coil 88 in a manner well known in the art so as to maintain the temperatures within reboiler 86 and column 90 at desired values so that different components of the vaporized portion of the composite liquid will condense at different points along the length of column 90.

The temperature adjacent coil 96 is such that the working fluid, i.e., isobutane in the example given, will condense at that point. Most of the condensed isobutane will accumulate in the uppermost tray 102 of column 90, which tray is located immediately below coil 96. A first outlet conduit 104 communicates with column 90 adjacent tray 102 so as to discharge liquid isobutane collected in that tray into a vessel 106. The isobutane which is not condensed and dropped into tray 102 will cascade downwardly through column 90 as reflux. The reflux ratio is controlled by adjusting the portion of condenser coil 96 under which tray 102 is located.

The additive fluid, or hexane, as well as any other substances heavier than the working fluid, will condense at points in column 90 below tray 102 but above reboiler 86. Thus, total reflux conditions will exist with respect to these heavier components. The incoming composite liquid passing through inlet 92 and the lower portion of column 90 will also help to entrain heavier components and carry them into the body of liquid in the lower portion of reboiler 86. On the other hand, any substances more volatile than the working fluid will not condense in column 90 and can be discharged therefrom as an overhead fraction through a conduit 108 and controlled by a valve 110. Any such light components which should enter vessel 106 along with the isobutane will naturally separate from the isobutane in that vessel and are vented into outlet conduit 108 by a conduit 112.

It can thus be seen that the separation sub-system described above not only serves to separate the working fluid from the additive and lubricant fluids, but also serves as a purification system which will remove from the working fluid any other lighter or heavier substances. The purified working fluid in vessel 106 can then be recycled through the turboexpander. The level of isobutane in vessel 106 is controlled by a float control valve mechanism 116 operatively connected to a pump 118. Pump 118 propels the isobutane through a conduit 120 into reservoir 22 for recycling through rotor 12 by pump 20.

The body of liquid in reboiler 86 will comprise lubricant and additive fluid. This liquid is discharged, as a bottom fraction, through an outlet conduit 122 communicating with reboiler 86 and regulated by a float control mechanism 124. This liquid is quite hot. Thus, a portion of what would otherwise be dissipated as waste heat may be utilized by passing the hot lubricant and additive fluid in conduit 122 through heat exchanger 84 in non-communicative heat exchange relationship with the incoming composite liquid in conduit 78 to preheat the latter. The additive fluid and lubricant then passes into reservoir 50 and is recycled through bearings 38 and 40 by pump 54 as described above.

The above represents only one embodiment of the present invention, and it will be understood that numerous modifications can be made within the scope of the present invention. For example, in the apparatus shown, the contact zone for the working fluid and lubricant is the chamber 72 located between first and second seals 76 might be eliminated, with bearing 38 serving as the only seal between the bearing area and working fluid area of the housing. In such systems, a contact zone receiving both the working fluid and lubricant would still be defined between the first seal and the rotor so that the invention could be applied to such systems. By the same token, although the invention has particular application as described to rotary devices such as turboexpanders and compressors, it also has application to other devices such as centrifuges and the like wherein power is also exchanged with a working fluid.

Although it is particularly convenient to have the additive fluid mixed with and circulating with the lubricant throughout the system, it is possible, as previously mentioned, to provide the additive fluid only in part of the system including the fractional distillation zone. As also previously mentioned, some systems employ a seal gas in conjunction with a seal such as 76 located between the rotor and the contact zone. In such systems, the contact fluid which becomes dissolved in the lubricant in the contact zone would comprise such seal gas. Contact fluid in the form of seal gas can be separated from the lubricant by fractional distillation in the presence of additive fluid in substantially the same manner as described above in connection with contact fluid in the form of working fluid. The recycling portion of the system would then be suitably modified to recycle the recovered seal gas through the seal rather than through the rotor.

Still other variations will suggest themselves to those of skill in the art. Accordingly, it is intended that the scope of the invention be limited only by the claims which follow.

I claim:

1. In a process for effecting a pressure change in a working fluid by passing the working fluid through a rotor and wherein a shaft extends longitudinally from and rotates with said rotor within a surrounding housing means which defines a contact zone between the rotor and a first seal means generally surrounding the shaft in axially spaced relation to the rotor to receive a lubricant fluid and a contact fluid, said lubricant fluid having a minimum boiling point and an additive fluid mixed therewith is injected into the first seal means adjacent the shaft at a pressure sufficient to cause the lubricant fluid to flow axially toward the rotor, the steps comprising:

collecting from said contact zone a composite liquid comprising said contact fluid, said additive fluid and said lubricant fluid; and separating said contact fluid from said composite liquid in the presence of said additive fluid having a boiling point greater than the maximum boiling point of said contact fluid, but less than the minimum boiling point of said lubricant fluid.

2. The process of claim 1 wherein said working fluid is soluble in said lubricant fluid.

3. The process of claim 2 wherein the contact fluid is separated from the composite liquid in a fractional distillation zone.

4. The process of claim 3 wherein said fractional distillation includes heating said composite liquid to a temperature greater than or equal to the boiling point of the mixture of said additive fluid and said lubricant fluid but less than the minimum boiling point of said lubricant fluid.

5. The process of claim 4 further comprising recovering the contact fluid from said distillation zone after said contact fluid has been vaporized and then condensed in said distillation zone.

6. The process of claim 5 comprising the further step of discharging from said distillation zone an overhead fraction comprising components having boiling points lower than said contact fluid.

7. The process of claim 5 wherein said contact fluid comprises the working fluid of said rotor.

8. The process of claim 7 comprising the further step of recycling said working fluid discharged from said distillation zone through said rotor.

9. The process of claim 5 comprising introducing said composite liquid into an intermediate point in said distillation zone.

10. The process of claim 9 comprising the further step of discharging liquid lubricant fluid from a lower portion of said distillation zone and recycling said discharged lubricant fluid through said first seal means.

11. The process of claim 10 comprising the further step of heating said composite liquid prior to its introduction into said distillation zone by passing said composite liquid in non-communicative heat exchange relation with said lubricant fluid discharged from said distillation zone.

12. The process of claim 10 including mixing said additive fluid with said lubricant fluid and cycling said additive fluid through said first seal means with said lubricant.

13. The process of claim 12 in which said lubricant fluid has a viscosity greater than desired for lubrication of said first seal means so as to compensate for a decrease in viscosity effected by said mixing of said additive fluid with said lubricant fluid.

14. The process of claim 12 wherein said additive fluid is soluble in said lubricant fluid.

15. In a process for exchanging power with a working fluid wherein a shaft extends longitudinally from and rotates within a surrounding housing means which defines a contact zone with a first seal means generally surrounding the shaft to receive a lubricant fluid and a contact fluid, said lubricant fluid having a minimum boiling point and an additive fluid mixed therewith is injected into the first seal means adjacent the shaft at a pressure sufficient to cause the lubricant fluid to flow axially, the steps comprising:

collecting from said contact zone a composite liquid comprising said contact fluid, said additive fluid and said lubricant fluid; and separating said contact fluid from said composite liquid in the presence of said additive fluid having a boiling point greater than the maximum boiling point of said contact fluid, but less than the minimum boiling point of said lubricant fluid.

* * * * *